United States Patent
Todd

(10) Patent No.: US 6,437,946 B2
(45) Date of Patent: *Aug. 20, 2002

(54) COARSE AND FINE POSITIONING DEVICE EMPLOYING A SINGLE DRIVING MECHANISM

(75) Inventor: Christian Allen Todd, Thornton, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/818,825

(22) Filed: Mar. 27, 2001

Related U.S. Application Data

(63) Continuation of application No. 09/363,770, filed on Jul. 29, 1999, now Pat. No. 6,229,674.

(51) Int. Cl.[7] .................................................. G11B 5/55
(52) U.S. Cl. ..................................... 360/261.1; 360/291
(58) Field of Search ..................... 360/261.1, 291–291.2, 360/75, 77.12, 78.02, 261.2, 261.3, 271

(56) References Cited

U.S. PATENT DOCUMENTS

| | | | | |
|---|---|---|---|---|
| 4,028,735 A | * | 6/1977 | Miyazaki | 360/106 |
| 5,191,495 A | * | 3/1993 | Takahara | 360/106 |
| 5,371,636 A | * | 12/1994 | Nayak et al. | 360/75 |
| 5,434,732 A | * | 7/1995 | Schwarz et al. | 360/109 |
| 5,438,469 A | * | 8/1995 | Rudi | 360/109 |
| 5,450,257 A | * | 9/1995 | Tran et al. | 360/76 |
| 5,519,554 A | * | 5/1996 | Todd et al. | 360/106 |
| 5,566,039 A | * | 10/1996 | Spicer | 360/106 |
| 5,661,616 A | * | 8/1997 | Tran et al. | 360/77.12 |
| 5,901,008 A | * | 5/1999 | Nayak et al. | 360/78.02 |
| 5,923,494 A | * | 7/1999 | Arisaka et al. | 360/78.02 |
| 5,949,619 A | * | 9/1999 | Eckberg et al. | 360/106 |
| 6,043,958 A | * | 3/2000 | Kaaden et al. | 360/109 |
| 6,075,678 A | * | 6/2000 | Saliba | 360/106 |

* cited by examiner

Primary Examiner—Jefferson Evans
(74) Attorney, Agent, or Firm—Brooks & Kushman P.C.

(57) ABSTRACT

An apparatus for positioning a transducer includes a fixed frame and a moving frame movably associated with the fixed frame such that the moving frame is movable between a plurality of discrete positions relative to the fixed frame. A carriage is movably associated with the moving frame and has the transducer mounted thereon. The apparatus further includes an actuator associated with the carriage. The actuator is operative to move the moving frame to a selected discrete position of the plurality of discrete positions, and is further operative to move the carriage relative to the moving frame when the moving frame is in the selected discrete position.

25 Claims, 4 Drawing Sheets

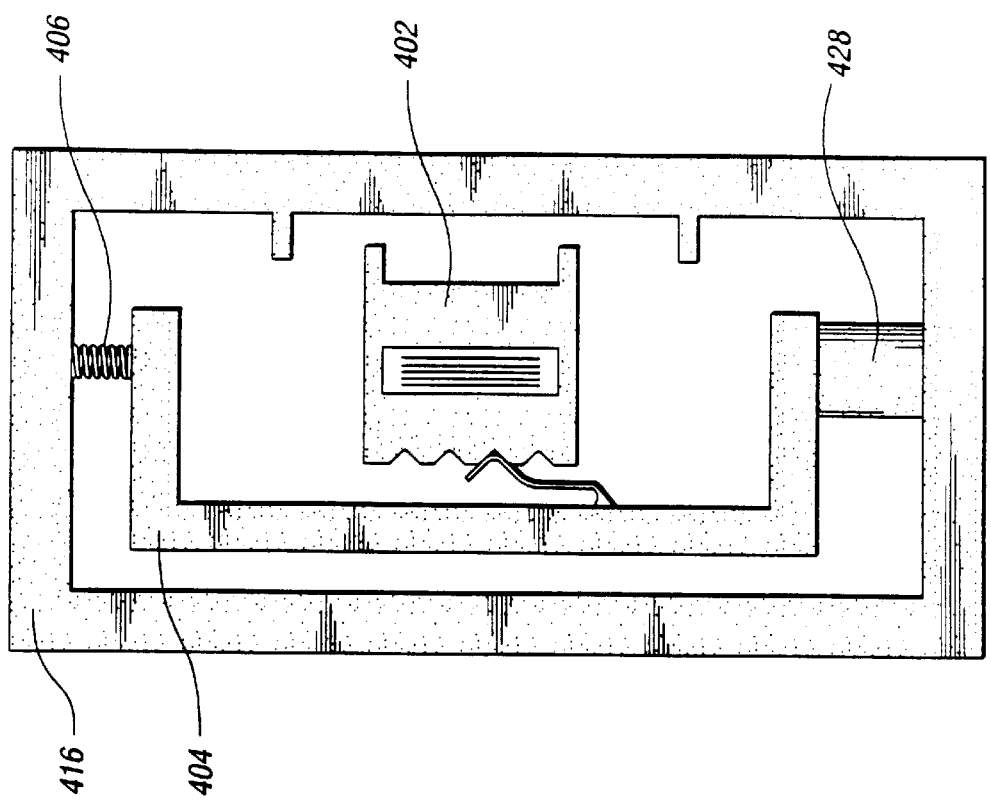
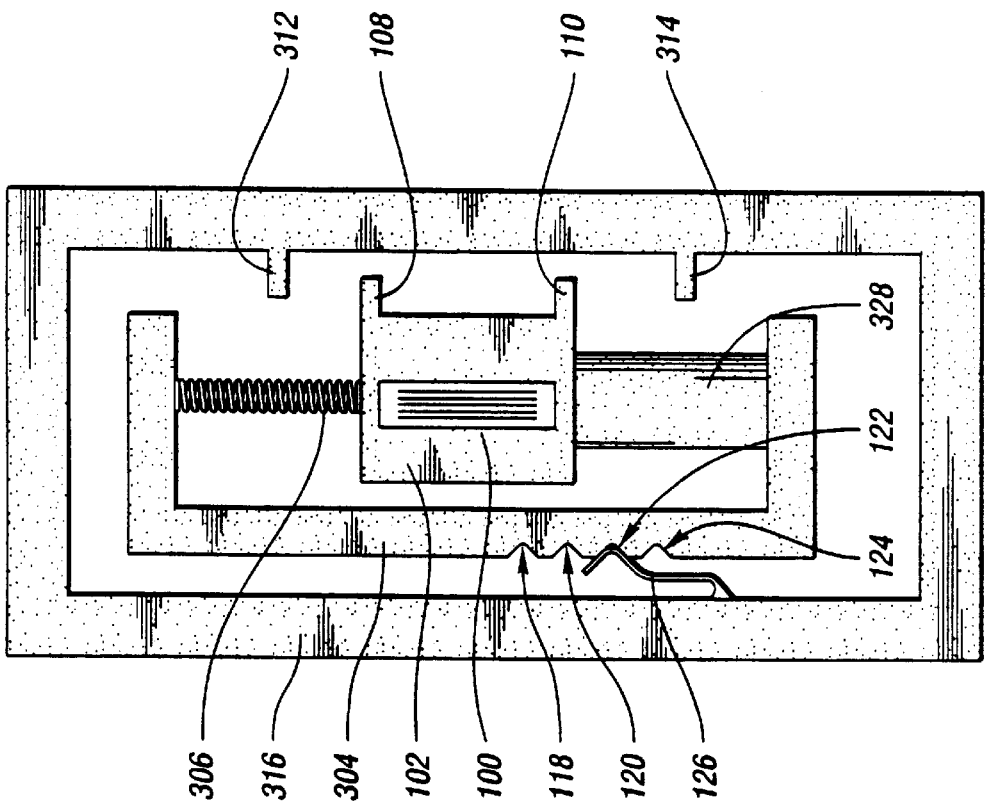

COARSE AND FINE POSITIONING DEVICE EMPLOYING A SINGLE DRIVING MECHANISM

This is a continuation of application(s) Ser. No. 09/363,770 filed on Jul. 29, 1999, now U.S. Pat. No. 6,229,674.

TECHNICAL FIELD

This invention relates to the field of tape media read-write head positioning devices.

BACKGROUND ART

Read-write head positioning devices used in magnetic tape drives to align the read-write head with data in the magnetic tape often incorporate a two actuator design. One actuator provides coarse positioning to move the read-write head between data bands. The other actuator provides fine positioning to maintain alignment between the read-write head and the data tracks. The two actuators are usually mounted in a "piggyback" arrangement with the fine position actuator riding on the coarse position actuator.

The coarse positioning actuator is typically a linear stage driven by a stepper motor. Stepper motors have the ability to move the linear stage anywhere across the width of the magnetic tape at modest speeds. However, most stepper motors lack the accuracy and bandwidth necessary to maintain alignment between the read-write head and the data tracks as the magnetic tape moves across the face of the read-write head.

The fine positioning actuator is typically a voice coil mounted on the linear stage and held at a rest position by some type of spring. A voice coil actuator provides micron to submicron precision positioning at a bandwidth of hundreds to thousands of hertz. However, a single voice coil and spring combination that can meet the fine positioning requirements across the full width of the tape is expensive and unnecessary.

The combination of coarse positioning and fine positioning is desired to meet the requirements associated with reading and writing on the magnetic tapes. Current solutions involve two actuators, their respective controllers, and a significant amount of hardware. What is desired is a simpler positioning device that requires only one actuator and minimal hardware.

DISCLOSURE OF INVENTION

Under the invention, an apparatus for positioning a transducer includes a fixed frame and a moving frame movably associated with the fixed frame such that the moving frame is movable between a plurality of discrete positions relative to the fixed frame. A carriage is movably associated with the moving frame and has the transducer mounted thereon. The apparatus further includes an actuator associated with the carriage. The actuator is operative to move the moving frame to a selected discrete position of the plurality of discrete positions, and is further operative to move the carriage relative to the moving frame when the moving frame is in the selected discrete position.

Further under the invention, an apparatus for positioning a transducer includes a fixed frame and a moving frame movably associated with the fixed frame. A carriage having the transducer mounted thereon is movably associated with the moving frame such that the carriage is movable between a plurality of discrete positions relative to the moving frame. The apparatus further includes an actuator associated with the moving frame. The actuator is operative to move the carriage to a selected discrete position of the plurality of discrete positions, and is further operative to move the moving frame relative to the fixed frame when the carriage is in the selected discrete position.

Advantageously, in each of the above embodiments, a single actuator may be used to provide coarse and fine positioning of the transducer. The actuator in each of the above embodiments may be a voice coil, for example. Furthermore, coarse and fine positioning may be achieved by varying the current through windings of the actuator.

A method is also provided for positioning a transducer disposed on a carriage, wherein the carriage is resiliently coupled to a moving frame, the moving frame is movably associated with a fixed frame such that the moving frame is movable between a plurality of discrete positions, and an actuator is associated with the carriage for displacing the carriage. The method includes activating the actuator to displace the carriage so as to move the moving frame from a current discrete position of the plurality of discrete positions to a desired discrete position of the plurality of discrete positions.

Further under the invention, a method is provided for positioning a transducer disposed on a carriage, wherein the carriage is movably associated with a moving frame such that the carriage is movable between a plurality of discrete positions relative to the moving frame, the moving frame is resiliently coupled to a fixed frame, and wherein an actuator is associated with the moving frame for displacing the moving frame. The method includes activating the actuator to displace the moving frame so as to move the carriage from a current discrete position of the plurality of discrete positions to a desired discrete position of the plurality of discrete positions.

These and other objects, features and advantages will be readily apparent upon consideration of the following detailed description in conjunction with the accompanying drawings.

BRIEF DESCRIPTION OF DRAWINGS

FIG. 3 is a side view of an alternate embodiment of the present invention;

FIG. 4 is a side view of a third embodiment of the present invention;

BEST MODE FOR CARRYING OUT THE INVENTION

The present invention uses a moving frame and a detent mechanism to provide coarse positioning of the moving frame, a carriage riding on the moving frame, and a transducer riding on the carriage. Fine positioning of the carriage and transducer is achieved by moving the carriage relative to the moving frame using a single actuator. Coarse position movement is achieved by pushing the moving frame with the carriage.

Figure 1:
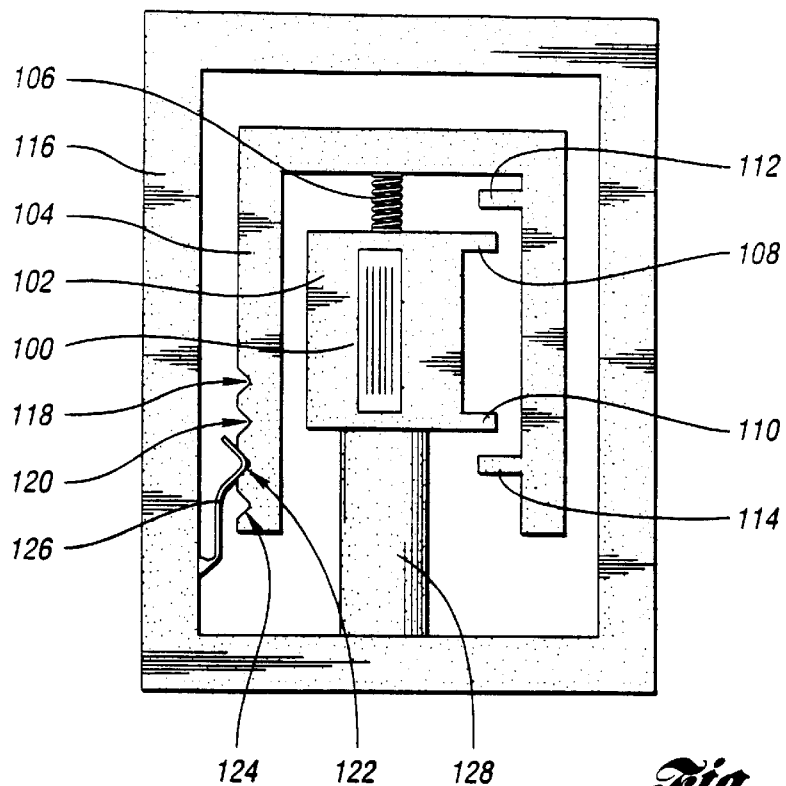
FIG. 1 is a side view of a first embodiment of the present invention.

FIG. 1 is a side view of a first embodiment of the transducer positioning device in accordance with the present invention. The transducer 100 is mounted on a carriage 102. Carriage 102 is coupled to a moving frame 104 through a resilient member 106. Carriage 102 has two mechanical stops 108 and 110 that are positioned near two stop abutments 112 and 114 of the moving frame 104 respectively. Mechanical stops 108 and 110, and stop abutments 112 and 114 transfer force from the carriage 102 to the moving frame 104 when engaged during coarse position movements. The moving frame 104 is attached to a fixed frame 116 through a detent mechanism. Multiple detent notches 118–124 in the moving frame 104, and a click 126 attached to the fixed frame 116 form the detent mechanism. Detent notches 118–124 create four discrete positions that coarsely align the transducer 100 with four respective data bands on a tape medium (not shown). More or fewer detent notches 118–124 may be used to match the number of data bands accordingly. Actuator 128 is disposed between the carriage 102 and the fixed frame 116 to provide coarse position and fine position movement.

Figure 2:
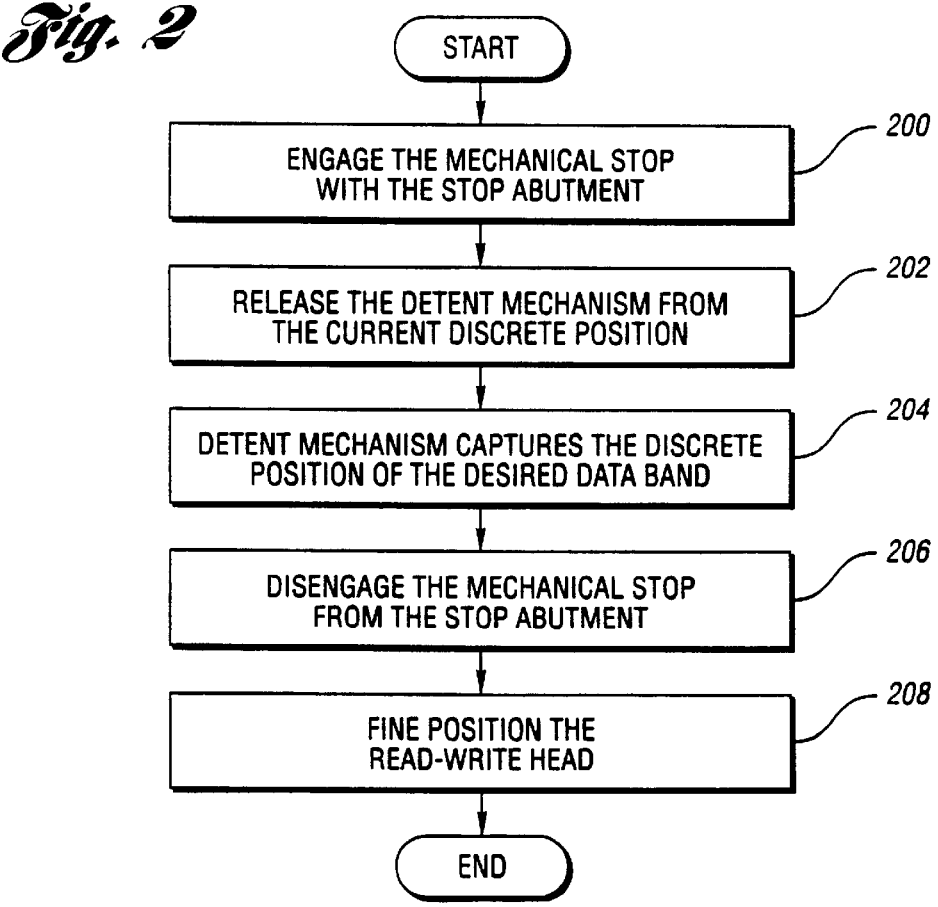
FIG. 2 is a flow diagram of a process for coarse and fine positioning the carriage and the transducer.

A process for positioning of the transducer 100 with respect to the fixed frame 116 is shown in FIG. 2. Coarse positioning starts with actuator 128 changing its displacement to drive the carriage 102 in a desired direction. This movement of the carriage 102 causes the appropriate mechanical stop 108 or 110 to engage with the respective stop abutment 112 or 114, as shown in block 200. Driving carriage 102 further in the desired direction applies a force on the moving frame 104 in the desired direction. The force on the moving frame 104 in turn, causes the detent mechanism to release from the current discrete position, as shown in block 202. Actuator 128 continues to drive the carriage 102 and moving frame 104 in the desired direction until the click 128 captures in the detent notch 118–124 associated with the desired data band, as shown in block 204. Coarse positioning ends when power to the actuator 128 is reduced causing the mechanical stop 108 or 110 to disengage from the respective stop abutment 112 or 114, as shown in block 206. With the carriage 102 re-centered in the moving frame 104, actuator 128 fine positions the carriage 102 and transducer 100, as shown in block 208.

In the embodiment shown in FIG. 1, the detent mechanism holds the carriage 102 at several discrete coarse positions relative to the fixed frame 116. These different coarse positions require the actuator 128 and resilient member 106 to meet the fine positioning precision requirement across a wide range of actuator displacements. In particular, actuator 128 must be capable of finely positioning the carriage 102 when the click 126 is seated in the detent notch 118, when the click 126 is seated in the detent notch 124, and when the click 126 is seated in all detent notches in between.

FIG. 3 shows an alternate embodiment where the actuator 328 and resilient member 306 are required to meet the fine positioning requirement about only one rest position. In this embodiment, the actuator 328 is disposed between the carriage 102 and the moving frame 304, instead of between the carriage 102 and fixed frame 316. Resilient member 306 will cause the de-energized actuator 328 to have the same rest position displacement no matter which detent notch 118–124 has captured the click 126.

One tradeoff for a simpler actuator 328 is an increased size of the moving frame 304 in the lateral direction of the tape medium (not shown) to fit the actuator 328. Another tradeoff is an increased amount of time required to move from one data band to another data band. To change discrete positions of the detent mechanism, the actuator 328 must first engage a mechanical stop 108 or 110 with a respective stop abutment 312 or 314 on the fixed frame 316. With the carriage 102 held in place by the stop abutment 312 or 314, the actuator can force the moving frame 304 to change coarse positions. This arrangement requires the stop abutments 312 and 314 to be positioned beyond the desired data center-line of the outer data bands. Consequently, each coarse adjustment starts with the carriage 302 moving laterally beyond the data center-line in the outer bands, and ends with the carriage 302 returning to the data center-line of the desired band. When the transducer 100 is near one edge of the tape medium, a coarse movement toward that edge requires almost two full transitions across the width of the tape medium. Consider, for example, moving the transducer 100 from a third band to a fourth band of a four band tape medium. First, the transducer 100 must traverse across the second band and then the first band to engage the proper mechanical stop with the respective stop abutment. Next, the moving frame 304 is repositioned to align with the fourth band. Afterwards, the transducer 100 must traverse back across the first band, the second band and the third band before it reaches the fourth band.

FIG. 4 shows another embodiment of the present invention where the detent mechanism is disposed between the moving frame 404 and the carriage 402, and the actuator 428 and resilient member 406 are disposed between the moving frame 404 and the fixed frame 416. Operations of this embodiment are the same as the embodiment shown in FIG. 3. One advantage of the embodiment shown in FIG. 4 over that shown in FIG. 3 is that the weight of the actuator 428 is carried by the fixed frame 416 instead of by the detent mechanism.

Figure 5:
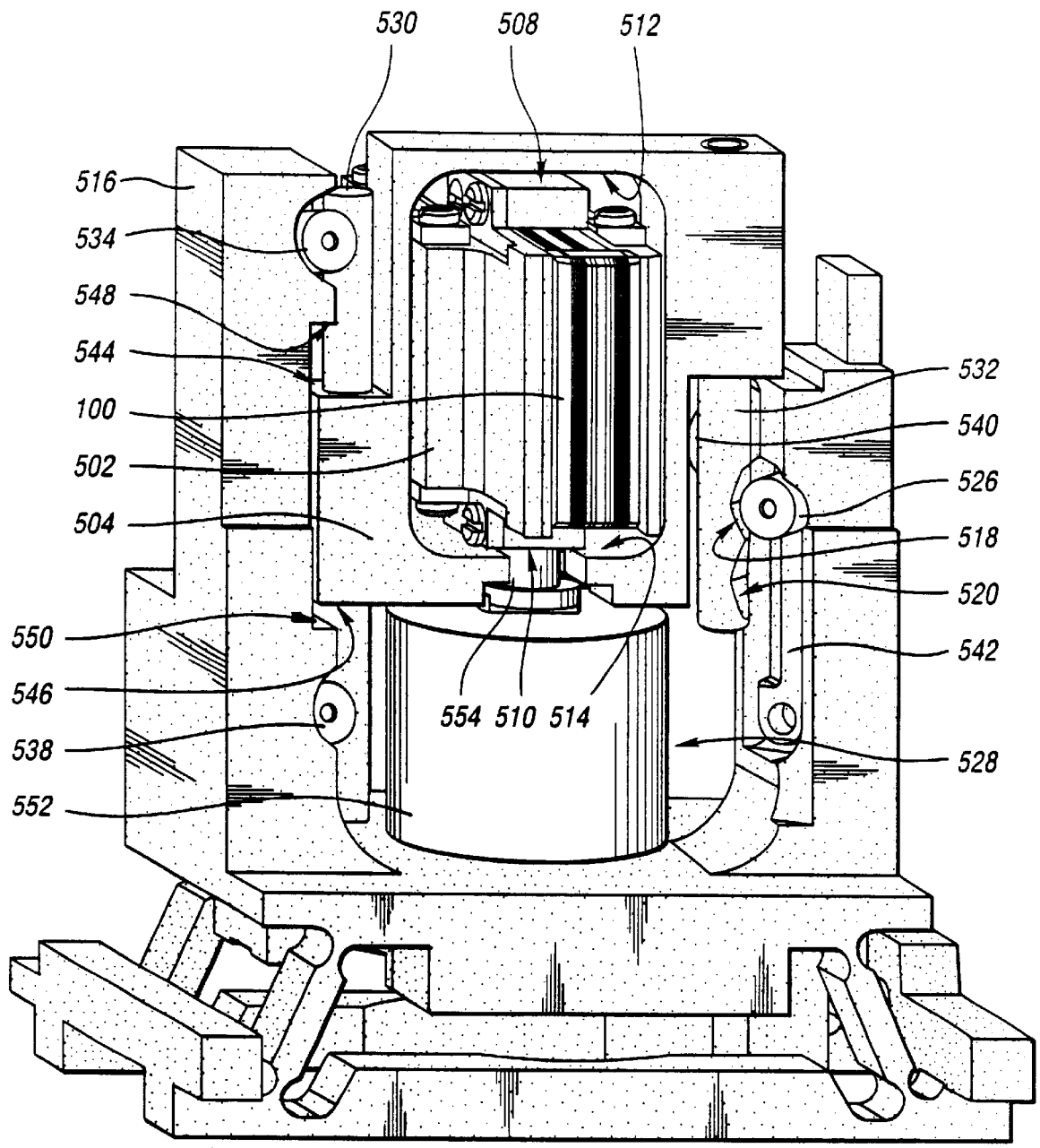
FIG. 5 is a perspective view of the preferred embodiment as seen from the tape side of the transducer.
Figure 6:
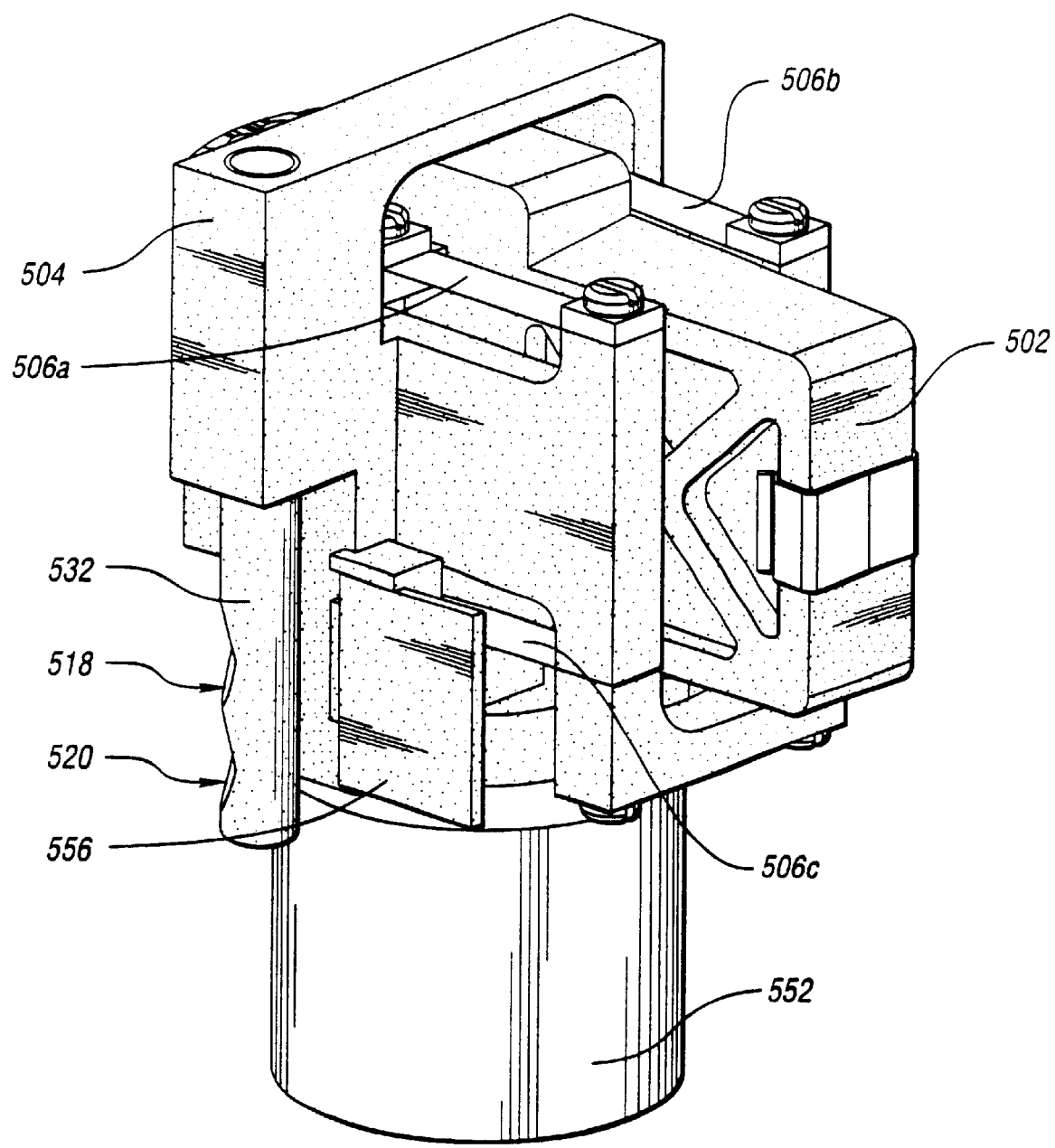
FIG. 6 is a partial perspective view of the preferred embodiment showing the flexures.

The preferred embodiment of the present invention is shown in FIG. 5 and FIG. 6. FIG. 5 is a perspective view as seen from the tape medium (not shown) side. FIG. 6 is a perspective view as seen from the opposite side and does not include the fixed frame. The basic mechanics of this embodiment are similar to that shown in FIG. 1. This preferred embodiment allows for transducer movement between data bands on the order of fifty to one hundred milliseconds, and a fine positioning bandwidth on the order of six hundred hertz.

Referring to FIG. 5, the transducer 100 is mounted on the carriage 502. The resilient member is four flexures 506a–506c (visible in FIG. 6) and 506d (not shown) connecting the carriage 502 to the moving frame 504. The flexures 506a–506d are made of thin metal strips that allow the carriage 502 to be displaced laterally (as defined by the tape medium) but not longitudinally with respect to the moving frame 504. The flexures 506a–506d also allow for submicron movement in the presence of dust and debris that can accumulate on their surfaces. Sometimes, the flexures 506a–506d are referred to as leaf springs or cantilevered leaf springs. Mechanical stops 508 and 510 are the top and bottom surfaces respectively of the carriage 502. Stop abutments 512 and 514 are inside surfaces of the moving carriage 504 opposite the mechanical stops 508 and 510 respectively.

The moving frame 504 slides relative to the fixed frame 516 on two rails 530 and 532 are guided by several guide bearings 534, 536 (not shown), 538, 539 (not shown), and 540. These guide bearings 534–540 are rotatably mounted to the fixed frame 516. A sixth bearing 526 is attached to the fixed frame 516 by a load arm 542 and acts as both a guide bearing and the click. Two detent notches 518 and 520 in rail 532 define two discrete positions for coarse positioning of the transducer 100.

Additional mechanical stops 544 and 546 and stop abutments 548 and 550 are defined on surfaces of the moving frame 504 and fixed frame 516 respectively. The mechanical stops 544-546 and the stop abutments 548–550 mechanically limit the range of motion of moving frame 504 with respect to the fixed frame 516. This keeps the rails 530 and 532 in contact with the guide bearings 534–540 and the sixth bearing 526.

The actuator in the preferred embodiment is a voice coil 528. Voice coil 528 comprises a permanent magnet 552 surrounding a winding (not shown) mounted on a rod 554. Permanent magnet 552 is attached to the fixed frame 516. Rod 554 is attached directly to the carriage 502. The longitudinal length of the permanent magnet 552 is sufficient to allow the winding to remain inside a uniform magnetic field when the sixth bearing 528 is in either detent notch 518 or 520. This gives the voice coil 528 the same fine positioning characteristics at both coarse positions.

Referring to FIG. 6, a glass scale 556 is mounted on the moving frame 504 and an associated sensor (not visible) is mounted on the fixed frame 516 to provide feedback into the servo system controller (not shown). The glass scale 556 and associated sensor inform the servo system controller in which detent notch 518–520 that the sixth bearing 526 is resting. This information in turn, identifies the data band in the tape medium that is coarsely aligned with the transducer 100

The embodiments shown in FIGS. 1, 3 and 4 may also include a sensor S. For the embodiments shown in FIGS. 1 and 3, the sensor S is disposed between the fixed frame 116, 316 and the moving frame 104, 304, and the sensor S is operative to detect the selected discrete position of the plurality of discrete positions of the moving frame 104, 304. For the embodiment shown in FIG. 4, the sensor S is disposed between the carriage 402 and the moving frame 404, and the sensor S is operative to detect the selected discrete position of the plurality of discrete positions of the carriage 402.

Many variations on the detent mechanism and actuator are possible within the scope of the present invention. For example, the detent notches and click placement may be reversed. Referring back to FIG. 1, the detent notches may be part of the fixed frame while the click is attached to the moving frame. The detent notches may be replaced by detent bosses, holes, and other shapes. The click may be a resilient metal strip, a bearing at the end of a load arm, a ball biased into the detent notches, and other configurations known in the art. Other types of actuators may also be used such as a moving iron, electrostatic, piezoelectric and the like. Variations of a voice coil actuator may also be employed. For example, the voice coil may have two windings, one winding to produce fine position movement, and another winding to produce coarse position movement.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for positioning a transducer comprising:
   a fixed frame;
   a moving frame movably associated with the fixed frame such that the moving frame is movable between a plurality of discrete positions relative to the fixed frame;
   a carriage movably associated with the moving frame and having the transducer mounted thereon; and
   an actuator associated with the carriage, the actuator being operative to move the moving frame to a selected discrete position of the plurality of discrete positions and to move the carriage relative to the moving frame when the moving frame is in the selected discrete position.

2. The apparatus of claim 1 wherein the moving frame has two stop abutments, and the carriage has at least one mechanical stop engageable with the stop abutments.

3. The apparatus of claim 2 wherein the carriage has two mechanical stops engageable with the stop abutments.

4. The apparatus of claim 1 wherein the fixed frame has two stop abutments, and the carriage has at least one mechanical stop engageable with the stop abutments.

5. The apparatus of claim 4 wherein the carriage has two mechanical stops engageable with the stop abutments.

6. The apparatus of claim 1 wherein the actuator is disposed between the carriage and the fixed frame.

7. The apparatus of claim 1 wherein the actuator is disposed between the carriage and the moving frame.

8. The apparatus of claim 1 wherein the actuator is a voice coil.

9. The apparatus of claim 1 further comprising a detent mechanism disposed between the fixed frame and the moving frame, the detent mechanism defining the plurality of discrete positions.

10. The apparatus of claim 1 further comprising at least one resilient member disposed between the carriage and the moving frame, the resilient member resiliently coupling the carriage to the moving frame.

11. The apparatus of claim 10 wherein the at least one resilient member includes at least one leaf spring.

12. The apparatus of claim 1 further comprising a sensor disposed between the fixed frame and the moving frame, the sensor being operative to detect the selected discrete position of the plurality of discrete positions.

13. An apparatus for positioning a transducer comprising:
   a fixed frame;
   a moving frame movably associated with the fixed frame;
   a carriage having the transducer mounted thereon and being movably associated with the moving frame such that the carriage is movable between a plurality of discrete positions relative to the moving frame; and
   an actuator associated with the moving frame, the actuator being operative to move the carriage to a selected discrete position of the plurality of discrete positions and to move the moving frame relative to the fixed frame when the carriage is in the selected discrete position.

14. The apparatus of claim 13 wherein the fixed frame has two stop abutments, and the carriage has at least one mechanical stop engageable with the stop abutments.

15. The apparatus of claim 14 wherein the carriage has two mechanical stops engageable with the stop abutments.

16. The apparatus of claim 13 wherein the actuator is disposed between the moving frame and the fixed frame.

17. The apparatus of claim 13 wherein the actuator is a voice coil.

18. The apparatus of claim 13 further comprising a detent mechanism disposed between the moving frame and the carriage, the detent mechanism defining the plurality of discrete positions.

19. The apparatus of claim 13 further comprising at least one resilient member disposed between the moving frame and the fixed frame, the resilient member resiliently coupling the moving frame to the fixed frame.

20. The apparatus of claim 19 wherein the at least one resilient member includes at least one leaf spring.

21. The apparatus of claim 13 further comprising a sensor disposed between the carriage and the moving frame, the sensor being operative to detect the selected discrete position of the plurality of discrete positions.

22. A method for positioning a transducer disposed on a carriage, wherein the carriage is resiliently coupled to a moving frame, the moving frame is movably associated with a fixed frame such that the moving frame is movable between a plurality of discrete positions, and an actuator is associated with the carriage for displacing the carriage, the method comprising:

activating the actuator to displace the carriage so as to move the moving frame from a current discrete position of the plurality of discrete positions to a desired discrete position of the plurality of discrete positions.

23. The method of claim 22 further comprising fine positioning the carriage with the actuator and relative to the moving frame when the moving frame is in the desired discrete position.

24. A method for positioning a transducer disposed on a carriage, wherein the carriage is movably associated with a moving frame such that the carriage is movable between a plurality of discrete positions relative to the moving frame, the moving frame is resiliently coupled to a fixed frame, and an actuator is associated with the moving frame for displacing the moving frame, the method comprising:

activating the actuator to displace the moving frame so as to move the carriage from a current discrete position of the plurality of discrete positions to a desired discrete position of the plurality of discrete positions.

25. The method of claim 24 further comprising fine positioning the moving frame with the actuator and relative to the fixed frame when the carriage is in the desired discrete position relative to the moving frame.

* * * * *